UNITED STATES PATENT OFFICE 2,119,149

STABILIZED CHLORINATED PARAFFIN WAX AND METHOD OF PRODUCING

William T. Bishop, Wilmington, Del., assignor to Hercules Powder Company, Wilmington, Del., a corporation of Delaware No Drawing. Application April 9, 1935, Serial No. 15,505

15 Claims. (Cl. 260—162)

This invention relates to stabilized chlorinated paraffin waxes and to methods for effecting such stabilization.

Chlorinated paraffin waxes, as prepared by various known methods, slowly decompose, liberating hydrogen chloride. This characteristic renders them unfit for many uses for which they would otherwise be well suited. The slow decomposition referred to and the hydrogen chloride thereby produced are not to be confused with the hydrogen chloride present in impure chlorinated paraffin waxes as taken from the chlorinating apparatus. This latter hydrogen chloride is a by-product of the chlorination and may be removed by known purification treatments, as, for example, by passing a stream of air or carbon dioxide through the agitated, molten chlorinated paraffin wax. The purified chlorinated paraffin wax so produced will nevertheless, upon standing for a few hours, give off appreciable amounts of hydrogen chloride through decomposition.

Now in accordance with this invention it has been found that chlorinated paraffin wax may be stabilized so that its decomposition is greatly retarded by being thoroughly washed or admixed with an alkaline liquid, as, for example, an aqueous solution of sodium hydroxide, sodium carbonate, potassium hydroxide, potassium carbonate, calcium hydroxide, sodium bicarbonate, potassium bicarbonate, ammonia, amines, etc., which is later separated from the chlorinated paraffin wax.

The alkaline liquid employed will preferably, for greater ease of separation after treatment, be immiscible with chlorinated paraffin wax. Accordingly aqueous or alcoholic solutions are the preferred alkaline liquids. Where an aqueous solution of an alkali metal or alkaline earth metal hydroxide or carbonate is used as the alkaline liquid, the concentration of the solution may vary within wide limits, but preferably 1 to 20% solutions of alkali metal hydroxides or carbonates and saturated or nearly saturated solutions of alkali earth metal hydroxides or carbonates will be used.

The chlorinated paraffin wax, if liquid, will be treated directly with the alkaline liquid. If the chlorinated paraffin wax is a solid, it will preferably be melted or dissolved in a solvent immiscible with the alkaline liquid to be used, as, for example in aromatic hydrocarbons such as toluene or benzene, carbon tetrachloride, ether, etc., before treatment to insure better contact with the alkaline liquid. The chlorinated paraffin wax and the alkaline liquid may be used in accordance with this invention in any amounts and proportions convenient for thorough admixture and contact.

In order to insure thorough and complete contact between the chlorinated paraffin wax and the alkaline liquid it is desirable to agitate the mixture vigorously during the treatment. The stabilization treatment may be carried out at any temperature, but desirably a temperature of from about 50° C. to about 100° C., and preferably of from about 70° C. to about 80° C., will be employed. The necessary duration of the treatment cannot be given exactly, for it will vary widely for different products treated and for different alkaline materials. However, a period of from ½ to 6 hours will usually suffice for satisfactory stabilization.

Where the chlorinated paraffin wax or solution thereof and the alkaline liquid are immiscible, as will usually be the case, the agitation employed during treatment forms an emulsion. The stabilized chlorinated paraffin wax may be separated from this emulsion by a variety of methods. For example, it may be recovered by distillation of the alkaline liquid or aqueous phase thereof, by centrifugation or settling, and by extraction with a solvent therefor, as, for example, ether, toluene, naphtha, benzene, carbon tetrachloride, turpentine, etc. This last method of recovery, being most simple and efficient, is preferred.

Surprisingly, it has been found in accordance with this invention that the degree of stabilization effected is, to a large extent, dependent upon the use of particular solvents in the recovery of the chlorinated paraffin wax from the emulsion above described. Thus, when ether or toluene is used as a solvent in recovering chlorinated paraffin wax from this emulsion, a product of much greater stability is obtained than when the chlorinated paraffin wax is recovered by using other solvents or in any other manner.

The following examples are illustrative of procedure in accordance with this invention and demonstrate the increase in stability of chlorinated paraffin wax obtained by various procedures:

About 400 g. chlorinated paraffin wax (Sample A) containing 46% combined chlorine and free from uncombined chlorine or hydrogen chloride was added to 2½ liters of a saturated solution of calcium hydroxide, and the mixture was vigorously agitated for about eight hours at a temperature of 75°–80° C. The emulsion so formed was divided into two portions. One portion was extracted with ether and the ether evaporated for the recovery of the chlorinated paraffin wax. This material was designated Sample A2. The second portion was distilled for the removal of the water present, and the mixture of chlorinated paraffin wax and calcium hydroxide thinned slightly with carbon tetrachloride and filtered. The chlorinated paraffin wax recovered from the filtrate was designated Sample A3. The stability of Samples A2 and A3 compared with each other and with the untreated original Sample A are tabulated below:

The stability data are obtained by a test which consisted in heating a 1-gram sample of chlorinated paraffin wax in a 6" x ½" test tube, with a piece of Congo red test paper ½" x ½" suspended by a wire so that the lower edge of the paper is 4½" from the surface of the sample. The wire is held by a cork which tightly closes the test tube. The test tube is then heated in a bath at 100° C., and the time required for the Congo red paper to change color from red to blue at its lower edge recorded as a measure of stability of the sample under test.

| Sample No. | Description of sample | Stability at 100° C. |
|---|---|---|
| A | Original sample (washed entirely free of uncombined Cl or HCl). | 0 minute. |
| A2 | Sample after alkali treatment and extraction with ether. | 22 hours. |
|  | Duplicate test on Sample A2 | 20½ hours. |
| A3 | Sample after alkali treatment and removal of water by distillation. | 3 hours. |
|  | Duplicate test on Sample A3 | 6½ hours. |
|  | Duplicate test on Sample A3 | 4 hours. |

It will be noted that Sample A3 which had been subjected to the alkali treatment but not the ether extraction was decidedly more stable than the original sample. Sample A2, however, which had had the alkali treatment followed by the ether extraction showed a stability test more than four times that of Sample A3. The action of the ether in improving the stability is obviously very great.

A further portion of chlorinated paraffin wax (Sample A) was treated with calcium hydroxide solution as described above and the emulsion produced divided into two portions. One of these was then extracted with ether, and the other with naphtha for the recovery of the chlorinated paraffin wax. The two samples so obtained were designated A4 and A5 respectively, and comparative data on their stability is tabulated below:

| Sample No. | Description of sample | Stability |
|---|---|---|
| A | Original sample | 0 minute. |
| A4 | Ether extracted sample (test stopped before failure). | 6 hours. |
| A5 | Naphtha extracted sample | ½–1 hour. |

It will be noted that naphtha does not give the stabilization that ether does. In fact a comparison of the stability shown for Sample A5 in this table with that shown for Sample A3 above, seems to indicate that the naphtha extraction actually lowers the stability. It should be noted, however, that these samples had had separate alkali treatments, which probably account for this difference. It is believed, from a large number of experiments, that the naphtha extraction has no effect one way or the other on the stability.

Another 200 g. portion of chlorinated paraffin wax (Sample A) was vigorously agitated at 80° C. for several hours with an equal volume of 1.5% sodium hydroxide solution. The emulsion formed was allowed to stand over night, whereupon the chlorinated paraffin wax settled almost completely. The alkali solution was decanted off and the chlorinated paraffin wax washed with distilled water. The wash became slightly alkaline and was neutralized with hydrochloric acid. Further decantation and washing was carried out until neutral conditions were obtained. The chlorinated paraffin wax was then transferred to a distilling flask and the water distilled out. The following stability tests were secured:

| Sample No. | Description of sample | Stability |
|---|---|---|
| A | Original sample | 0 minute. |
| A6 | Sample washed with sodium hydroxide solution. | 5 hours. |
|  | Duplicate test on sample A6 | 4¾ hours. |

About 300 g. of a chlorinated paraffin wax (Sample B) containing 40.7% combined chlorine and free from uncombined chlorine and hydrogen chloride was agitated for about 4 hours at 80° C. with 1 liter of saturated calcium hydroxide solution. The resulting emulsion, after cooling, was divided into three equal portions. The portions were extracted with ether, naphtha and toluol, respectively, and the chlorinated paraffin wax recovered from each extract and tested for stability. The data obtained are tabulated below:

| Sample No. | Ca(OH)₂ washed recovered from | Stability at 100° C. |
|---|---|---|
|  |  | Hours |
| B1 | Ether | 2¾ |
|  | Duplicate | 2 |
|  | Duplicate | 2½ |
| B2 | Naphtha | 1¼ |
|  | Duplicate | 1½ |
| B3 | Toluol | 2 |
|  | Duplicate | 1¼ |

Another 300 g. portion of chlorinated paraffin wax (Sample B) was similarly treated with a 2% sodium hydroxide solution as the alkaline liquid. Stability data on three samples of chlorinated paraffin wax recovered in the same manner with ether, naphtha and toluol, respectively, follow:

| Sample No. | 2% NaOH washed recovered from | Stability at 100° C. |
|---|---|---|
|  |  | Hours |
| B4 | Ether | 13 |
|  | Duplicate | 10½ |
| B5 | Naphtha | 1 |
|  | Duplicate | 1¼ |
| B6 | Toluol | 10 |
|  | Duplicate | 13 |

A further portion of chlorinated paraffin wax (Sample B) was similarly treated with a 5% sodium hydroxide solution. Two portions of the resultant emulsion were separately extracted with naphtha and ether, and stability data obtained on the chlorinated paraffin wax recovered, follow:

| Sample No. | 5% NaOH washed recovered from | Stability at 100° C. |
|---|---|---|
|  |  | Hours |
| B7 | Naphtha | ¼ |
|  | Duplicate | 1¾ |
|  | Duplicate | 1 |
| B8 | Ether | 57 |
|  | Duplicate | No change at 57 hours. |

200 g. of chlorinated paraffin wax (Sample B) were then similarly treated with a 2% sodium bicarbonate solution. The emulsion produced was separated into two portions, and the portions extracted with ether and naphtha, respectively. The stability tests on the recovered chlorinated paraffin wax are tabulated below:

| Sample No. | 2% NaHCO₃ washed recovered from | Stability at 100° C. |
| --- | --- | --- |
| | | Minutes |
| B9 | Ether | 17 |
| | Duplicate | 20 |
| B10 | Naphtha | 5 |
| | Duplicate | 7 |

Chlorinated paraffin wax (Sample C) containing 46% combined chlorine was treated with a 5% solution of sodium hydroxide in the manner hereinbefore described. The emulsion formed was extracted with ether, and the extract evaporated for recovery of the chlorinated paraffin wax. Stability data are tabulated below:

| Sample No. | 5% NaOH washed recovered from | Stability at 100° C. |
| --- | --- | --- |
| | | Hours |
| C1 | Ether | 48 |
| | Duplicate | 48½ |

200 g. of chlorinated paraffin wax (36% Cl) were given a water wash followed by a 5% alcoholic-sodium hydroxide solution wash at room temperature for three hours. The washed product was ether extracted and recovered. This treatment produced a stability of one hour at 100° C.

The stability of the chlorinated paraffin waxes produced in accordance with this invention may be further increased by the incorporation therein of organic bases, as for example, aniline, pyridine, etc., as is more fully disclosed in an application Serial No. 19,468, filed May 2, 1935 by me jointly with Emil Ott.

It will be understood that the details and examples hereinbefore set forth are illustrative only, and are in no way in limitation of the invention as herein broadly described and claimed.

What I claim and desire to protect by Letters Patent is:

1. A method for the stabilization of chlorinated paraffin wax which includes admixing chlorinated paraffin wax with an alkaline liquid immiscible therewith, extracting the chlorinated paraffin wax from the mixture with a solvent therefor which is substantially immiscible with the alkaline liquid, and recovering a stabilized chlorinated paraffin wax from the extract.

2. A method for the stabilization of chlorinated paraffin wax which includes admixing chlorinated paraffin wax with an aqueous solution of an alkaline material, extracting the chlorinated paraffin wax from the mixture with a solvent therefor, which is substantially immiscible with the alkaline liquid, and recovering a stabilized chlorinated paraffin wax from the extract.

3. A method for the stabilization of chlorinated paraffin wax which includes admixing chlorinated paraffin wax with an aqueous sodium hydroxide solution, extracting the chlorinated paraffin wax from the mixture with a solvent therefor selected from the group consisting of ether and toluol, and recovering a stabilized chlorinated paraffin wax from the extract.

4. A method for the stabilization of chlorinated paraffin wax which includes admixing chlorinated paraffin wax with an aqueous calcium hydroxide solution, extracting the chlorinated paraffin wax from the mixture with a solvent therefor selected from the group consisting of ether and toluol, and recovering a stabilized chlorinated paraffin wax from the extract.

5. A method for the stabilization of chlorinated paraffin wax which includes admixing chlorinated paraffin wax with an alkaline liquid immiscible therewith, extracting the chlorinated paraffin wax from the mixture with ether, and recovering a stabilized chlorinated paraffin wax from the extract.

6. A method for the stabilization of chlorinated paraffin wax which includes admixing chlorinated paraffin wax with an alkaline liquid immiscible therewith, extracting the chlorinated paraffin wax from the mixture with toluol, and recovering a stabilized chlorinated paraffin wax from the extract.

7. A method for the stabilization of chlorinated paraffin wax which includes admixing chlorinated paraffin wax with an alkaline liquid immiscible therewith, agitating the mixture, extracting the chlorinated paraffin wax from the mixture with a solvent therefor selected from the group consisting of ether and toluol, and recovering a stabilized chlorinated paraffin wax from the extract.

8. A method for the stabilization of chlorinated paraffin wax which includes admixing chlorinated paraffin wax with an alkaline liquid immiscible therewith, agitating the mixture at a temperature of from about 50° C. to about 100° C., extracting the chlorinated paraffin wax from the mixture with a solvent therefor selected from the group consisting of ether and toluol, and recovering a stabilized chlorinated paraffin wax from the extract.

9. A method for the stabilization of chlorinated paraffin wax which includes admixing chlorinated paraffin wax with an alkaline liquid immiscible therewith, agitating the mixture for from about ½ to about 6 hours at a temperature of from about 50° C. to about 100° C., extracting the chlorinated paraffin wax from the mixture with a solvent therefor selected from the group consisting of ether and toluol, and recovering a stabilized chlorinated paraffin wax from the extract.

10. A highly stabilized chlorinated paraffin wax characterized by the fact that it possesses very little tendency to decompose with evolution of hydrogen chloride and comprising a chlorinated paraffin wax which has been admixed with an alkaline liquid and recovered from such mixture by extraction with a solvent therefor selected from the group consisting of ether and toluol.

11. A method for the stabilization of chlorinated paraffin wax which includes admixing chlorinated paraffin wax with an alkaline liquid immiscible therewith, extracting the chlorinated paraffin wax from the mixture with a solvent therefor selected from the group consisting of ether and toluol, and recovering a stabilized chlorinated paraffin wax from the extract.

12. A method for the stabilization of chlorinated paraffin wax which includes admixing chlorinated paraffin wax with an aqueous solution of an alkaline material, extracting the chlorinated paraffin wax from the mixture with a solvent therefor selected from the group consisting of ether and toluol, and recovering a stabilized chlorinated paraffin wax from the extract.

13. A highly stabilized chlorinated paraffin wax characterized by having a stability to evolution of hydrogen chloride of not less than about six hours when measured as the time required for the lower edge of a ½" x ½" piece of Congo red test paper to turn from red to blue in the presence of moisture when suspended 4½" from the surface of a 1 gram sample of chlorinated paraffin in a closed 6" x ½" test tube when heated in a bath at 100° C.

14. A method for the stabilization of chlorinated paraffin wax which includes admixing chlorinated paraffin wax with an aqueous sodium hydroxide solution, extracting the chlorinated paraffin wax from the mixture with a solvent which is substantially immiscible with the alkaline liquid and recovering a stabilized chlorinated paraffin wax from the extract.

15. A method for the stabilization of chlorinated paraffin wax which includes admixing chlorinated paraffin wax with an aqueous calcium hydroxide solution, extracting the chlorinated paraffin wax from the mixture with a solvent which is substantially immiscible with the alkaline liquid and recovering a stabilized chlorinated paraffin wax from the extract.

WILLIAM T. BISHOP.